(12) United States Patent
Christensen (10) Patent No.: US 12,330,939 B2
(45) Date of Patent: Jun. 17, 2025

(54) PLANT AND PROCESS FOR PRODUCING HYDROGEN WITH IMPROVED OPERATION OF A LOW TEMPERATURE $CO_2$ REMOVAL UNIT

(71) Applicant: TOPSOE A/S, Kgs. Lyngby (DK)

(72) Inventor: Steffen Spangsberg Christensen, Kgs. Lyngby (DK)

(73) Assignee: TOPSOE A/S, Kgs. Lyngby (DK)

( * ) Notice: Subject to any disclaimer, the term of this patent is extended or adjusted under 35 U.S.C. 154(b) by 0 days.

(21) Appl. No.: 18/977,199

(22) Filed: Dec. 11, 2024

(65) Prior Publication Data

US 2025/0100876 A1 Mar. 27, 2025

Related U.S. Application Data

(63) Continuation of application No. PCT/EP2023/081445, filed on Nov. 10, 2023.

(30) Foreign Application Priority Data

Nov. 16, 2022 (DK) .............................. PA202201051

(51) Int. Cl.
*C01B 3/24* (2006.01)
*C01B 3/50* (2006.01)

(52) U.S. Cl.
CPC ................ *C01B 3/24* (2013.01); *C01B 3/506* (2013.01); *C01B 2203/0475* (2013.01)

(58) Field of Classification Search
CPC .... C01B 3/24; C01B 3/506; C01B 2203/0475
See application file for complete search history.

(56) References Cited

U.S. PATENT DOCUMENTS

2009/0260518 A1* 10/2009 Wright ............... B01D 53/0462
 96/111
2009/0298957 A1 12/2009 Gauthier et al.
(Continued)

FOREIGN PATENT DOCUMENTS

EP 0535505 A1 4/1993
EP 0983963 A2 3/2000
(Continued)

OTHER PUBLICATIONS

Int'l Search Report and Written Opinion mailed May 2, 2024 in PCTEP2023081445.
(Continued)

*Primary Examiner* — Matthew J Merkling
(74) *Attorney, Agent, or Firm* — Leydig, Voit & Mayer, Ltd.

(57) ABSTRACT

A plant and process for producing a hydrogen rich gas are provided, said process including the steps of: steam reforming a hydrocarbon feed into a synthesis gas; shifting the synthesis gas and conducting the shifted gas to a hydrogen purification unit, subjecting $CO_2$-rich off-gas from the hydrogen purification unit to a carbon dioxide removal in a low temperature $CO_2$-removal section and recycling $CO_2$-depleted off-gas rich in hydrogen to the process. A drying unit upstream the $CO_2$-removal section is provided, under the addition of regeneration gas produced in the plant and process.

30 Claims, 1 Drawing Sheet

(56) References Cited

U.S. PATENT DOCUMENTS

| | | | |
|---|---|---|---|
| 2010/0126180 A1* | 5/2010 | Forsyth | B01D 53/229 62/617 |
| 2010/0288123 A1* | 11/2010 | Chen | C01B 3/501 95/93 |
| 2012/0090353 A1 | 4/2012 | Chen | |
| 2012/0241678 A1* | 9/2012 | Valentin | C01B 3/48 252/373 |
| 2017/0087505 A1* | 3/2017 | Hashi | B01D 53/0423 |
| 2017/0101313 A1 | 4/2017 | Allam | |
| 2017/0267524 A1 | 9/2017 | Allam | |

FOREIGN PATENT DOCUMENTS

| | | |
|---|---|---|
| EP | 2141119 A1 | 11/2012 |
| WO | WO 2000027505 A1 | 5/2000 |
| WO | WO 2011088982 A1 | 7/2011 |
| WO | WO 2016187125 A1 | 11/2016 |
| WO | WO 2017075564 A1 | 5/2017 |
| WO | WO 2019228797 A1 | 12/2019 |
| WO | WO 2022038089 A1 | 2/2022 |
| WO | WO 2022038090 A1 | 2/2022 |

OTHER PUBLICATIONS

Search and Exam Report dated May 23, 2024 issued in Denmark Application No. PA202201051.

* cited by examiner

PLANT AND PROCESS FOR PRODUCING HYDROGEN WITH IMPROVED OPERATION OF A LOW TEMPERATURE $CO_2$ REMOVAL UNIT

CROSS-REFERENCE TO RELATED APPLICATIONS

This application is a continuation application of International Application No. PCT/EP2023/081445, filed Nov. 10, 2023 (WO 2024/104905), which claims priority to and the benefit of Denmark Patent Application Serial No. PA202201051, filed Nov. 16, 2022, each of which are hereby incorporated by reference in their entireties.

FIELD OF THE INVENTION

The present invention relates to a to a plant and process for the production of hydrogen from a hydrocarbon feed, which comprises reforming, shift conversion, hydrogen purification under the production of an off-gas and low temperature removal of $CO_2$ from the off-gas.

BACKGROUND

Low temperature $CO_2$ removal technology, in particular $CO_2$ removal technology based on separation of $CO_2$ in a cryogenic unit from off-gas generated in the hydrogen purification unit of a plant and process for producing hydrogen, requires that the off-gas is dried before feeding it to the cryogenic unit. The hydrogen purification unit is typically a pressure swing adsorption unit (PSA unit) which is fed with reformed and water-gas shifted syngas (shifted syngas). The PSA unit produces a hydrogen product as well as a PSA off-gas, in which the latter is typically used as fuel in the burners of a fired heater, or the burners of an upstream reforming unit, typically a conventional steam methane reformer (SMR), also referred to as tubular reformer or reforming furnace.

WO 2016187125 A1 discloses a process for incremental hydrogen production of an existing plant for producing hydrogen from natural gas. The existing plant comprises steam reforming, water gas shift and hydrogen purification in a pressure swing adsorption (PSA) unit, thereby producing a first $H_2$-stream and a PSA off-gas stream. The PSA off-gas (first waste stream) is compressed, dried and $CO_2$ is then removed from the stream in a low temperature $CO_2$ separation unit. A remaining waste stream is produced and sent to a second PSA unit, from which a second $H_2$-stream is withdrawn, as well as a second PSA off-gas stream (second waste stream) which is passed to the steam reforming furnace as fuel gas. The compressed first waste gas stream is dried in an adsorbent bed drier which is regenerated by a nitrogen gas stream.

WO 0027505 A1 discloses a process for recovery of $CO_2$ and $H_2$ from PSA off-gas in a hydrogen plant. A first PSA off-gas is passed to an absorber using a solvent to remove the $CO_2$. A $CO_2$-rich solvent is produced as well as a hydrogen enriched compressed off-gas. The solvent with the absorbed $CO_2$ is transferred to a flash unit and the concentrated $CO_2$ product is recovered. The regenerated solvent is subsequently recycled to the absorber. A liquefaction unit receives and liquefies $CO_2$ from the flash unit, while the hydrogen enriched compressed off-gas is directed to a second PSA unit.

US2009298957 A1 discloses a process for combined production of hydrogen and carbon dioxide from a mixture of hydrocarbons wherein residual PSA is treated to produce a carbon dioxide-enriched fluid. The PSA off-gas is dried in a drying unit from which subsequently, $CO_2$ is produced by liquefaction. A purge stream containing incondensable compounds from the liquefaction is then treated in a permeation module, from which a hydrogen-rich permeate is generated and recycled to the inlet of the PSA unit. A portion of this permeate is diverted to the drying unit for the regeneration of the dryers, and then reincorporated in the un-diverted fraction recycled to the PSA unit.

SUMMARY

It would be desirable to provide an improved integration of a plant and process for producing hydrogen comprising low temperature separation of $CO_2$ of off-gas withdrawn from the hydrogen purification unit of said process and plant.

Accordingly, in a first aspect of the invention, there is provided a plant (100) for producing a hydrogen product (8) from a hydrocarbon feed (1), said plant comprising:
- a reforming unit (110), said reforming unit (110) being arranged to receive a hydrocarbon feed (1, 2) and convert it to a syngas stream (3);
- a shift section (115, 150) being arranged to receive syngas stream (3) from the steam reforming unit (110) and shift it into a shifted syngas stream (5);
- a hydrogen purification unit (125), arranged to receive said shifted syngas stream (5) and separate it into a high-purity $H_2$ stream as said hydrogen product (8), and a $CO_2$-rich off-gas stream (9);
- a steam header arranged to receive steam produced by the cooling of at least any of: said syngas stream (3) and said shifted syngas stream (5);
- a $CO_2$-rich off-gas recycle compressor (185), arranged to receive and compress said $CO_2$-rich off-gas stream (9) into a compressed $CO_2$-rich off-gas stream (9');
- a drying unit (190) arranged to receive the compressed $CO_2$-rich off-gas stream (9') and provide a dried compressed $CO_2$-rich off-gas stream (9"); said drying unit (190) further being arranged to receive an inlet regeneration gas stream (19) and to withdraw an exit regeneration gas stream (19'); said drying unit (190) further comprising: a heat exchanging unit which is arranged to preheat the inlet regeneration gas stream (19) by indirect cooling of a heat exchanging medium selected from any of: steam (13") from said steam header, syngas stream (3), shifted syngas stream (5), and combinations thereof; and provide a cooled heat exchanging medium as a steam condensate (13") or as a cooled synthesis gas i.e. a cooled syngas stream (3) or a cooled shifted syngas stream (5);
- a low temperature $CO_2$-removal section (180) arranged to receive said dried compressed $CO_2$-rich off-gas stream (9''') for removal of $CO_2$ from the $CO_2$-rich off-gas stream (9) or from said dried compressed $CO_2$-rich off-gas stream (9"), thereby also from said compressed $CO_2$-rich off-gas stream (9'), and provide at least: a $CO_2$-product stream (11) and a $CO_2$-depleted off-gas stream (17, 17', 17").

Also provided, in a second aspect of the invention, as recited farther below, is a process for producing a $H_2$-rich stream from a hydrocarbon feed, using the plant as defined herein.

Further details of the invention are set out in the following description, following FIGURE, aspects, embodiments and corresponding dependent claims.

As used herein, the term "first aspect of the invention" means the plant (system) according to the invention; the term "second aspect of the invention" means the process according to the invention.

As used herein, the term "comprising" encompasses also "comprising only" i.e. "consisting of".

As used herein, the use of the article "a" or "an" means "one or more", or interchangeably "at least one", i.e. it covers the singular and plural form. For instance, the term "a reforming unit" means one or more reforming units. For instance, a reforming unit is a combination of an autothermal reformer (ATR) as defined farther below, and a heat exchange reformer (HER) as also defined farther below. For instance also, a reforming unit is an ATR, such as an ATR with an upstream pre-reformer, as also defined farther below.

As used herein, and as is well-known in the art, the term "syngas" means "synthesis gas", i.e. a gas comprising CO, $CO_2$ and $H_2$. The term may sometimes also be referred to as "process gas".

As used herein, the term "plant/process" means plant and/or process. It would be understood that the term "plant" means the plant for producing a hydrogen product, and may be used interchangeably with the term "hydrogen plant" or "plant producing hydrogen".

As used herein, the term "and/or" means in connection with a given embodiment any of three options. The term "and/or" may be used interchangeably with the term "at least one of" the three options.

As used herein, the term "suitably" means "optionally", i.e. an optional embodiment.

As used herein, the term "present invention" or simply "invention" may be used interchangeably with the term "present application" or simply "application".

As used herein, the term "drying unit", as is well-known in the art, means a unit arranged upstream the low temperature $CO_2$-removal section for removing water vapor from the gas, here the compressed $CO_2$-rich off gas stream. A drying unit can use a variety of technologies to remove water vapor from the gas stream, including: adsorption using materials such as silica gel or molecular sieves for attracting and holding water molecules; absorption using desiccants that absorb water. For instance, the drying unit comprising parallel desiccant beds, in which one desiccant bed is used for drying and the other desiccant bed is used for regeneration. In the regeneration, a hot dry gas is passed through the desiccant bed saturated with water, which causes the adsorbed water to desorb and be removed with the gas. A particular embodiment of the drying unit is a temperature swing adsorption unit (TSA).

As used herein, the term "low temperature $CO_2$-removal section", as is well-known in the art, means a section in which a gas stream, here the dried compressed $CO_2$-rich off-gas stream, is cooled to sub-zero temperatures to condense and separate $CO_2$. A particular embodiment of a low temperature $CO_2$-removal section is a cryogenic separation unit. A cryogenic separation unit operates at extreme low temperatures in the range of e.g. −50 to −80° C. and high pressure in the range of e.g. 20 to 70 bar. The extreme low temperature enables to condense $CO_2$ out of the gas stream, and the high pressure enables to keep the $CO_2$ in the condensed phase.

Other embodiments of a low temperature $CO_2$-removal section, which are not cryogenic, include:

a physical absorption unit, whereby $CO_2$ is removed from the gas stream by dissolving it into a physical solvent, and in which he solvent is regenerated by reducing pressure and/or increasing the temperature for releasing the absorbed $CO_2$. Physical solvents include refrigerated methanol (Rectisol process) and refrigerated propylene carbonate (Selexol process);

an adsorption unit, whereby $CO_2$ is removed by adsorbing it onto the surface of an adsorbent solid material selected from any of zeolites, activated carbon, and amine-functionalized materials. The adsorbent solid material is then regenerated by reducing the pressure and/or increasing the temperature, thereby releasing the adsorbed $CO_2$. The adsorption unit is for instance a temperature swing adsorption (TSA) unit or a pressure swing adsorption (PSA) unit, which can operate at lower temperatures, yet are not considered cryogenic.

For instance, the low temperature $CO_2$-removal section is an amine wash unit, or a $CO_2$ membrane i.e. $CO_2$ membrane separation unit, $CO_2$-PSA, or a cryogenic separation unit. In particular, when using a $CO_2$ membrane separation unit, the permeate is the stream richer in hydrogen which may then be passed to a hydrogen purification unit, e.g. PSA unit, while the retentate is a hydrogen-lean stream which is recycled to the feed side of the reforming unit e, or feed side of shift section, or the feed side i.e. inlet side of the membrane separation.

Other definitions are provided in connection with one or more of below embodiments.

In an embodiment, said steam header is a low pressure (LP) steam header or a high pressure (HP) saturated steam header.

During the conversion of shifted syngas to hydrogen, prior to the hydrogen purification step in a hydrogen purification unit, water in the shifted synthesis gas is normally removed as process condensate in a process condensate separator (PC-separator).

In an embodiment, the plant further comprises a low-pressure boiler (LP boiler) for producing said steam by said cooling of at least any of: said syngas stream (3) and said shifted syngas stream (5).

As is well-known in the art, a LP boiler is a heat exchanging unit, also referred to as waste heat boiler (WHB), which operates at low pressure, i.e. approximately atmospheric pressure and the water (BFW) is heated to below about 120° C.

The invention enables that upstream the PC-separator, the shifted syngas is cooled:

firstly, in one or more preheaters configured as boiler(s), i.e. a LP boiler, using externally-sourced boiling feed water (BFW) thereby producing steam (LP steam) which is supplied to LP header;

secondly, in an air cooler, typically also referred to as process gas air cooler, and further downstream in a water cooler. The heat duty and size of the process gas air cooler is significantly reduced. A high duty (as measured by e.g. Gcal/h), means high energy consumption and thereby also high operating expenses (OPEX). Hence, the invention enables also a process gas air cooler of reduced size which thereby also results in reduced plot size with attendant reduction in capital expenses (CAPEX).

It is not typical in hydrogen plants to provide a LP boiler for the cooling of the shifted synthesis gas, or anywhere. The present invention encompasses the provision of such a LP boiler as a new embodiment to generate LP steam for the drying unit. The LP boiler is suitably arranged upstream or downstream shift section such as immediately upstream the air cooler.

The term "steam produced by the cooling of at least any of: said syngas stream and said shifted syngas stream"

means that the steam may also be produced elsewhere in the plant/process. LP steam may thus by the present invention be generated in the hydrogen plant and a LP steam header is thereby also provided from which the LP steam may be withdrawn. Where there is not enough LP steam, steam from a HP saturated steam header, also provided in the plant/process, is utilized.

The steam header, i.e. the LP steam header or the HP saturated steam header serves as reservoir for feeding steam to the individual heating units, here specifically the heat exchanging unit of the drying unit. It would be understood that, sometimes, there is a LP steam header in the plant where the LP steam can be taken from. In case of deficit of LP steam, HP steam from a steam drum (HP saturated steam header) is supplied to the LP steam header resulting in overall reduced steam export from the plant. In some instances, however, the plant is not provided with a LP steam header. Then alternatively, LP steam can be collected from a waste heat boiler (boiler) blow-down drum, yet the flow may not be sufficient. Hence, optionally the LP steam of the LP header is for instance collected from a so-called condensate drum (also referred herein to as blow-down drum) which is also arranged in the plant/process. A dedicated LP steam boiler, as recited in the above embodiment, may also be provided somewhere in the syngas cooling line, i.e. upstream air cooler, to generate LP steam; for instance, from process gas waste heat boiler to upstream the air cooler.

The steam condensate which is then produced in said heat exchanging unit of the drying unit may be routed back to a deaerator or water purification unit of the plant/process.

A preferred embodiment of the invention is thus to use the "hot" syngas from upstream air cooler—since the heat is anyway wasted in the air cooler. Another preferred embodiment is to use steam—first, the LP steam and second, the HP saturated steam. It is only valuable to use steam if the value of steam is low or zero. The plant/process enables flexibility in the choice of heat exchanging medium in the heat exchanging unit of the drying unit.

The integration provided by the present invention enables i.a. a reduced energy consumption and reduced size of the process gas air cooler, i.e. shifted syngas air cooler, since a significant part of the cooling of e.g. shifted syngas stream is actually effected in the heat exchanging unit which is arranged to preheat the inlet regeneration gas stream of the drying unit.

In an embodiment, the reforming unit is further arranged to withdraw a flue gas stream; and said low pressure (LP) steam header or said high pressure (HP) saturated steam header is arranged to receive steam produced by the cooling of said flue gas stream.

The flue gas is for instance generated in a steam methane reformer (SMR) as the reforming unit. The flue gas is for instance generated in a fired heater associated with the reforming unit for the preheating of the hydrocarbon feed, such as a fired heater associated with an autothermal reformer (ATR) as the reforming unit.

In an embodiment, said heat exchanging unit of drying unit (190) is arranged to preheat the inlet regeneration gas stream (19) by indirect cooling of said flue gas as said heat exchanging medium.

Further integration, in particular heat integration, is thereby provided, as heat is also recovered from the flue gas for producing steam and subsequently advantageously used in the heat exchanging unit of the drying unit.

A hot dry gas stream is required for regenerating the regeneration bed which is saturated with water of the drying unit, this unit suitably being a temperature swing adsorption (TSA) unit. For generating the hot gas stream, said heat exchanging unit (a heater) is provided, and steam or syngas or flue gas from the plant/process is used to heat the drying stream, i.e. the inlet regeneration gas stream. Also, a dry gas stream or hot dry gas stream of the plant may be used to regenerate the bed of the drying unit, as it will become apparent from one or more embodiments below.

In an embodiment, said low temperature $CO_2$-removal section (180) also provides a $CO_2$-recycling stream (21); and the plant is further arranged to feed at least a portion of said $CO_2$-recycling stream (21) to a location upstream said $CO_2$-rich off-gas recycle compressor (185) and downstream said hydrogen purification unit (125); or to combine at least a portion of said $CO_2$-recycling stream (21) with said shifted syngas stream (5) upstream said hydrogen purification unit (125).

This enables further integration as the $CO_2$-recycling stream may not only be utilized in the minor $CO_2$-rich off-gas stream downstream the hydrogen purification unit, but also in the major shifted syngas upstream the hydrogen purification unit.

The $CO_2$-recycling stream (21) comprises components not removed in the $CO_2$-product stream (11) and $CO_2$-depleted off-gas stream (17, 17', 17"). For instance, the $CO_2$-recycling stream (21) may still comprise some $CO_2$ and $H_2$ not withdrawn in the $CO_2$-product stream and $CO_2$-depleted off-gas stream.

The $CO_2$-product stream is a stream containing 95% vol. or more, for instance 99.5% vol. of carbon dioxide.

The $CO_2$-depleted off-gas stream is rich in hydrogen, comprises for instance at least 50% $H_2$ (vol. or mole %) and thus advantageously utilized in the plant and process. The $CO_2$-depleted off-gas stream comprises for instance: 85 mol % $H_2$, 7 mol % $CH_4$, 7 mol % CO and 1 mol % $N_2$+Ar. Hence, the $CO_2$-depleted off-gas stream is thus hydrogen-rich and essentially free of carbon dioxide.

In an embodiment, the plant (100) is further arranged for recycling said $CO_2$-depleted off-gas stream or a portion thereof (17, 17', 17"), at least to the feed side of the reforming unit (110).

Accordingly, at least a part of the compressed part of the $CO_2$-depleted off-gas stream is used in the process by becoming a part of the hydrocarbon feed or process gas being treated in e.g. the prereformer, or reforming unit, e.g. ATR, or shift section. Thereby, there is at least a reduction of hydrocarbon feed, e.g. natural gas, consumption for the same required hydrogen production while increasing the $CO_2$ capture and hence reducing the $CO_2$ emission.

The term "at least to the feed side of the reforming unit" means that the $CO_2$-depleted off-gas stream or a portion thereof (17, 17', 17") may also be recycled to the feed side of other units, such as prereformer, or as fuel for a fired heater, or to the shift section, as it will become apparent from one or more of below embodiments.

Accordingly, in an embodiment, the plant (100) further comprises at least one fired heater arranged to pre-heat said hydrocarbon feed (1, 2) prior to it being fed to the reforming unit (110), and said plant (100) is arranged to feed at least a part of the $CO_2$-rich off-gas stream (9) from said hydrogen purification unit (125), or at least part of said $CO_2$-depleted off-gas stream (17, 17', 17") as fuel for said fired heater.

Since a part of the $CO_2$-depleted off-gas is also used as fuel to a fired heater, there is low carbon emission from the flue gas generated in the fired heater, and thereby from the plant/process. It would be understood that flue gas is typically generated from the burning in the fired heaters. A separate fuel gas and/or a hydrogen fuel gas, together with combustion air are suitably used in the fired heater. The consumption of fuel gas such as natural gas, typically used for the burning, is significantly reduced or eliminated. The fired heater, apart from preheating the hydrocarbon feed gas to the prereformer and reforming unit, may also be used, for example, for superheating steam.

In an embodiment, the plant (100) further comprises at least one prereformer unit (140) arranged upstream the reforming unit (110), said prereformer unit (140) being arranged to pre-reform said hydrocarbon feed (1) prior to it being fed to the reforming unit (110).

As used herein, the terms prereformer, prereformer unit and prereforming unit, are used interchangeably.

In an embodiment, the pre-reformer unit is an adiabatic prereformer unit.

By providing a single pre-reformer unit, such as an adiabatic prereformer unit, a simpler plant and process are provided. Associated capital and operating expenses for provision of additional pre-reformers and attendant heat exchanging units, are eliminated.

In a prereforming unit all higher hydrocarbons can be converted to carbon oxides and methane, but the prereforming unit is also advantageous for light hydrocarbons. Providing a prereforming unit, hence prereforming step, may have several advantages including reducing the required oxygen consumption in a downstream autothermal reformer (ATR) and allowing higher inlet temperatures to the ATR since cracking risk by preheating is minimized. Furthermore, a prereforming unit may provide an efficient sulphur guard resulting in a practically sulphur-free feed gas entering the ATR and the downstream system. The prereforming step may be carried out at temperatures between 300-650° C., such as 390-480° C.

In an embodiment, the reforming unit is an autothermal reformer (ATR); a partial oxidation reformer ($PO_x$); a convection heated reformer such as a heat exchanger reformer (HER) or gas heated reformer (GHR); a steam methane reformer (SMR), such as an electrically heated steam methane reformer (e-SMR); or combinations thereof, such as a SMR in combination with (HER), or SMR in combination with ATR, or ATR in combination with HER.

All the above recited reforming units are well known in the art.

For instance:
in an autothermal reformer (ATR), there is partial oxidation of the hydrocarbon feed with oxygen and steam followed by catalytic reforming; in autothermal reforming (ATR), herein also encompassing the term catalytic partial oxidation (CPO), natural gas or other hydrocarbons are reacted with steam and an oxidant (air, enriched air, or oxygen) in the presence of a catalyst based on nickel or noble metals;
in non-catalytic partial oxidation ($PO_x$) of natural gas, light hydrocarbons, heavy hydrocarbons or solid feedstock such as coal (also referred to as gasification) is reacted with an oxidant (air, enriched air or oxygen) and outlet temperatures from the reactor of up to 1400° C. are obtained;
a convection heated reformer, may comprise one or more bayonet reforming tubes such as an HTCR reformer i.e. Topsøe bayonet reformer, where the heat for reforming is transferred by convection along with radiation;
the term SMR encompasses conventional SMR and e-SMR; in a conventional SMR, also referred to as tubular reformer, the heat for reforming is transferred chiefly by radiation in a radiant furnace; in electrically heated steam methane reformer (e-SMR), electrical resistance is used for generating the heat for catalytic reforming. In particular, when using e-SMR, electricity from green resources may be utilized, such as from electricity produced by wind power, hydropower, and solar sources, thereby further minimizing the carbon dioxide footprint.

For more information on these reformers, details are herein provided by direct reference to Applicant's patents and/or literature. For instance, for tubular and autothermal reforming an overview is presented in "Tubular reforming and autothermal reforming of natural gas—an overview of available processes", Ib Dybkjær, Fuel Processing Technology 42 (1995) 85-107, EP 0535505 for a description of HTCR, or e.g. EP 2526045 for a description of a HER, or e.g. EP 0983963 for a description of process combining ATR and HER. For a description of ATR and/or SMR (tubular reformer) for large scale hydrogen production, see e.g. the article "Large-scale Hydrogen Production", Jens R. Rostrup-Nielsen and Thomas Rostrup-Nielsen", CATTECH, volume 6, pages 150-159 (2002). For a description of e-SMR which is a more recent technology, reference is given to e.g. WO 2019/228797 A1.

In an embodiment, the catalyst in the reforming unit is a reforming catalyst, e.g. a nickel based catalyst. In an embodiment, the catalyst in the water gas shift reaction (i.e. in the shift section) is any catalyst active for water gas shift reactions. The said two catalysts can be identical or different. Examples of reforming catalysts are $Ni/MgAl_2O_4$, $Ni/Al_2O_3$, $Ni/CaAl_2O_4$, $Ru/MgAl_2O_4$, $Rh/MgAl_2O_4$, $Ir/MgAl_2O_4$, $Mo_2C$, $Wo_2C$, $CeO_2$, $Ni/ZrO_2$, $Ni/MgAl_2O_3$, $Ni/CaAl_2O_3$, $Ru/MgAl_2O_3$, or $Rh/MgAl_2O_3$, a noble metal on an $Al_2O_3$ carrier, but other catalysts suitable for reforming are also conceivable. The catalytically active material may be Ni, Ru, Rh, Ir, or a combination thereof, while the ceramic coating may be $Al_2O_3$, $ZrO_2$, $MgAl_2O_3$, $CaAl_2O_3$, or a combination therefore and potentially mixed with oxides of Y, Ti, La, or Ce. The maximum temperature of the reactor may be between 850-1300° C. The pressure of the feed gas may be 15-180 bar, preferably about 25 bar. Steam reforming catalyst is also denoted steam methane reforming catalyst or methane reforming catalyst.

In a particular embodiment, the reforming unit is an autothermal reformer (ATR). The ATR enables operating the plant/process at low steam/carbon ratio thereby i.a. reducing equipment size. For instance, the steam/carbon ratio of the synthesis gas supplied from the ATR to the shift section is less than 2.0 preferably 0.3-1.0.

Suitably also, the plant (100) is arranged to feed at least a part of the $CO_2$-depleted off-gas stream (17, 17') to the feed side of the prereformer unit (140); and/or
said plant (100) is arranged to feed at least a part of the $CO_2$-depleted off-gas stream (17) to the feed side of the shift section; and/or
said plant is arranged to feed at least a part of said $CO_2$-depleted off-gas stream to the feed side of the hydrogen purification unit (125).

As used herein, the term "feed side" means inlet side or simply inlet. For instance, the feed side of the reforming unit, e.g. ATR, means the inlet side of the ATR. For instance, the feed side of the shift section means the inlet side of the high or medium temperature shift unit, or the inlet side of any downstream shift unit downstream in said shift section, such as a medium temperature shift unit arranged downstream a high temperature shift unit.

Recycling of the $CO_2$-depleted off-gas stream to e.g. the ATR has the advantage of reducing the flow to the prereformer, and thereby reducing its size. More specifically, the recycling of $CO_2$-depleted off-gas increases the hydrogen recovery and thereby the feed consumption is reduced. Due to this, the upstream equipment may reduce in size.

Recycling of $CO_2$-depleted off-gas stream to the shift section has the advantage of reducing the size of both ATR and prereformer.

Suitably, the plant is without i.e. is absent of a steam methane reformer unit (SMR) upstream the ATR. Hence, the reforming section, i.e. the reforming unit, comprises an ATR and optionally also a pre-reforming unit, yet there is no steam methane reforming (SMR) unit, i.e. the use of e.g. a conventional SMR (also normally referred as radiant furnace, or tubular reformer) is omitted. Accordingly, in an embodiment, the reforming unit is an ATR with said one prereformer unit arranged upstream. The ATR together with a pre-reforming unit, i.e. stand-alone ATR, is a simple and energy efficient solution for the reforming section.

This conveys significant advantages in terms of energy consumption and plant size since it is now possible, among other things, to operate at steam to carbon molar ratios well below 1 and thereby significantly reducing the amount of steam carried in the plant/process, as also recited farther above.

Suitably, the plant further comprises a hydrogenator unit and a sulfur absorption unit arranged upstream said at least one pre-reformer unit, wherein said plant is arranged to feed at least a part of the $CO_2$-depleted off-gas stream to the feed side of the hydrogenator unit.

Suitably, the shift section comprises comprising a high or medium temperature shift unit. For instance, said shift section comprises one or more additional shift units downstream the high temperature shift (HTS) unit. In a particular embodiment, the one or more additional shift units are one or more medium temperature shift (MTS) units and/or one or more low temperature shift (LTS) units.

The provision of additional shifts units or shifts steps adds flexibility to the plant and/or process when operation at low steam/carbon ratios. The low steam/carbon ratio may result in a lower than optimal shift conversion which means that in some embodiments it may be advantageous to provide one or more additional shift steps. The one or more additional shift steps may include a medium temperature (MT) shift and/or a low temperature (LT) shift and/or a high temperature shift. Generally speaking, the more converted CO in the shift steps the more gained $H_2$ and the smaller front end required.

Steam may optionally be added before and after the high temperature shift step such as before one or more following MT or LT shift and/or HT shift steps in order to maximize performance of said following HT, MT and/or LT shift steps.

Having two or more high temperature shift steps in series (such as a high temperature shift step comprising two or more shift reactors in series e.g. with the possibility for cooling and/or steam addition in between) may be advantageous as it may provide increased shift conversion at high temperature which gives a possible reduction in required shift catalyst volume and therefore a possible reduction in capital expenses. Furthermore, high temperature reduces the formation of methanol, a typical shift step byproduct.

In an embodiment, said reforming unit (110) comprises an autothermal reformer (ATR), and the plant (100) further comprises an Air Separation Unit (ASU) (145) which is arranged to receive an air stream (14) and produce a $N_2$-rich stream (19) and an $O_2$-rich stream (15); and the inlet regeneration gas stream (19) is at least a portion of said $N_2$-rich stream.

Further integration is thereby provided. An ASU is often associated with an ATR, as the ATR utilizes the oxygen-rich stream produced in the ASU. The nitrogen-rich stream produced in the ASU is therefore now advantageously used as regeneration gas in the drying unit.

In an embodiment, the inlet regeneration gas stream (19) is selected from:
at least a portion of any of said: $CO_2$-product stream (11), $CO_2$-depleted off-gas stream (17, 17', 17"), $CO_2$-recycling stream (21), and dried compressed $CO_2$-rich off-gas stream (9");
at least a portion of said hydrogen product (8).

Typically, air is used as regeneration gas in drying units, for instance temperature swing adsorption (TSA) units. The present invention provides a superior solution to air as regeneration gas. Air is found to be disadvantageous because of mixing oxygen with hydrocarbons and provides no synergies with the plant/process for producing hydrogen. In contrast thereto, utilizing for instance the $CO_2$-product stream (11), $CO_2$-depleted off-gas stream (17, 17', 17"), $CO_2$-recycling stream (21), dried compressed $CO_2$-rich off-gas stream (9"), or the hydrogen product (8), as recited above, not only eliminates the disadvantages associated with mixing of oxygen and hydrocarbons (e.g. $CH_4$), but also provides synergistic integration with the plant/process as these streams being produced find a further beneficial use as regeneration gas.

The regeneration gases are generally cold but dry gases. They need to be heated up by the hot syngas or steam in order to dry the used bed. Hot gas can pick-up more water than a cold gas. Afterwards, the thus wet hot gas is cooled to condense the moisture and the cooled gas recycled to the heat exchanging unit of the drying unit.

Accordingly, in an embodiment, the plant further comprises:
a cooler arranged to receive the exit regeneration gas stream (19') for condensing its water content and to provide a dried exit regeneration gas stream;
a recycle regeneration gas compressor arranged to receive and compress the exit regeneration gas stream (19') or the dried exit regeneration gas stream into a compressed exit regeneration gas stream or compressed dried exit regeneration gas stream, and recycle it to:
inlet of said drying unit (190), e.g. by combining with inlet regeneration gas (19); or
inlet of said hydrogen purification unit (125), e.g. inlet of a PSA unit;
or
inlet of said $CO_2$-rich off-gas recycle compressor (185).

The exit regeneration gas stream is wet. This stream is thus cooled to condense the water and the thus cooled gas, now having its water removed, is recompressed and recycled back to the plant/process. For instance, when utilizing hydrogen as regeneration gas, it is after water removal recycled back to inlet the hydrogen purification unit, which is suitably a PSA unit; or where $CO_2$ is utilized, it is recycled back to $CO_2$-rich off-gas recycle compressor; or the dry exit regeneration gas is recycled back to inlet drying unit.

In an embodiment, the low temperature $CO_2$-removal section (180) is as cryogenic separation unit comprising a cryogenic compressor; the plant further comprising a superheated steam header and a steam turbine for providing electricity for said cryogenic compressor, and said steam turbine is arranged to receive a portion of said steam from said superheated steam header for providing said electricity.

It would be understood that the term "a cryogenic compressor" means "one or more cryogenic compressors.

Further integration is thereby provided. Typically, excess duty is exported as steam with low or no value, i.e. export steam often has low or no value, and thus represents an undesired by-product of the hydrogen plant/process. Utilizing this steam (superheated steam) for generating the electricity required for said compressor(s) of the low temperature $CO_2$-removal section, saves electrical power cost and lowers the associated operating expenses of the plant/process.

In an embodiment, the drying unit (190) is a temperature swing adsorption (TSA) unit, suitably a single TSA unit comprising two adsorption beds; and/or the hydrogen purification unit (125) is a pressure swing adsorption (PSA) unit, suitably a single PSA unit.

Both TSA and PSA are well-known in the art. In TSA, adsorbents are regenerated by applying heat. In PSA adsorbents are regenerated by reducing pressure.

In the present application, the heat applied for the TSA is provided by the above recited heat exchanging unit (heater) which utilizes steam, syngas or flue gas produced in the plant/process, for preheating the regeneration gas, thereby enabling high integration in the plant/process.

In an embodiment, the plant is arranged for said $CO_2$-depleted off-gas stream (17, 17', 17") or a portion thereof being directly recycled to at least the feed side of the reforming unit (110), i.e. a conduit is provided for directly recycling said $CO_2$-depleted off-gas stream or a portion thereof (17, 17', 17") to at least the feed side of the reforming unit (110).

Hence, the plant (100) is suitably absent of a second hydrogen purification unit, such as a second PSA unit, downstream said $CO_2$-removal section (180).

In an embodiment, the plant (100) is arranged to directly feed said shifted syngas stream (5) to said hydrogen purification unit (125). Hence, a $CO_2$-removal unit, typically arranged downstream the hydrogen purification unit for removing $CO_2$ from a major process gas stream, namely the shifted syngas stream, is obviated. $CO_2$-removal is thus provided only in the minor $CO_2$-rich off-gas stream from the hydrogen purification unit.

As used herein, the term "directly" means that there are no intermediate steps or units changing the composition of the stream. For instance, as depicted in the appended FIG. 1, the plant 100 is arranged for directly recycling said $CO_2$-depleted off-gas stream (17, 17', 17") or a portion thereof, at least to the feed side of the reforming unit 110. As also depicted in the appended FIG. 1, the plant (100) is arranged to directly feed said shifted syngas stream (5) to said hydrogen purification unit (125).

It would be understood that the $CO_2$-depleted off-gas stream or a portion thereof (17, 17', 17") may also be directly recycled to the feed side of other units, such as the prereformer (140), or as fuel for a fired heater, or to the shift section (115, 150).

Thereby, a simpler plant/process is provided, as a reduced number of steps or units in the plant/process are required.

Furthermore, typically a shifted synthesis gas is supplied to a $CO_2$-removal unit upstream the hydrogen purification unit. The $CO_2$-removal unit is typically also an amine wash unit and therefore a $CO_2$-reboiler is also provided which utilizes the heat (duty) of the synthesis gas, e.g. shifted synthesis gas, being produced. Since the $CO_2$-removal unit is omitted upstream the hydrogen purification unit, the present invention further provides the benefit of not requiring the $CO_2$-reboiler. Since there is no $CO_2$ reboiler, more duty is available in the plant/process for preheating purposes. The regeneration gas is preheated indirectly using e.g. LP steam generated from the boiler(s) arranged to cool synthesis gas or any other hot gas stream of the plant/process, as described above.

In a second aspect of the invention, there is also provided a process for producing a hydrogen product (8) from a hydrocarbon feed (1, 2), said process comprising the steps of:
provinding a plant (100) according to any of the preceding embodiments
supplying hydrocarbon feed (2) to the reforming unit (110), and converting it to syngas stream (3);
supplying stream of syngas (3) from the reforming unit (110) to the shift section (115, 150), and shifting it in a shift step, suitably a high or medium temperature shift step (115), thereby providing shifted syngas stream (5);
supplying the shifted gas stream (5) from the shift section to hydrogen purification unit (125), and separating it into high-purity $H_2$ stream as said hydrogen product (8) and $CO_2$-rich off-gas stream (9);

the process further comprising:
compressing said $CO_2$-rich off-gas stream (9) into compressed $CO_2$-rich off-gas stream (9');
drying compressed $CO_2$-rich off-gas stream (9') in a drying unit (190) under the addition of an inlet regeneration gas stream (19), thereby providing dried compressed $CO_2$-rich off-gas stream (9") and exit regeneration gas stream (19');
preheating the inlet regeneration gas stream (19) by indirect cooling of a heat exchanging medium selected from any of: steam (13") from a steam header, such as steam from LP steam header or steam from HP saturated steam header, syngas stream (3), shifted syngas stream (5), optionally flue gas stream being generated in said reforming unit (110), and combinations thereof; thereby providing a cooled heat exchanging medium as: steam condensate (13'''), cooled synthesis gas i.e. cooled, syngas stream (3) or cooled shifted syngas stream (5), or optionally as cooled flue gas stream;
supplying the dry compressed $CO_2$-rich off-gas stream (9''') to a $CO_2$-removal step in a low temperature $CO_2$-removal section (180), thereby providing a $CO_2$-product stream (11), a $CO_2$-depleted off-gas stream (17, 17', 17"), and optionally a $CO_2$-recycling stream (21).

It would be understood that any of the embodiments and associated benefits of the first aspect (plant) of the invention may be used in connection with the second aspect (process) of the invention, or vice versa.

DETAILED DESCRIPTION

Figure 1:
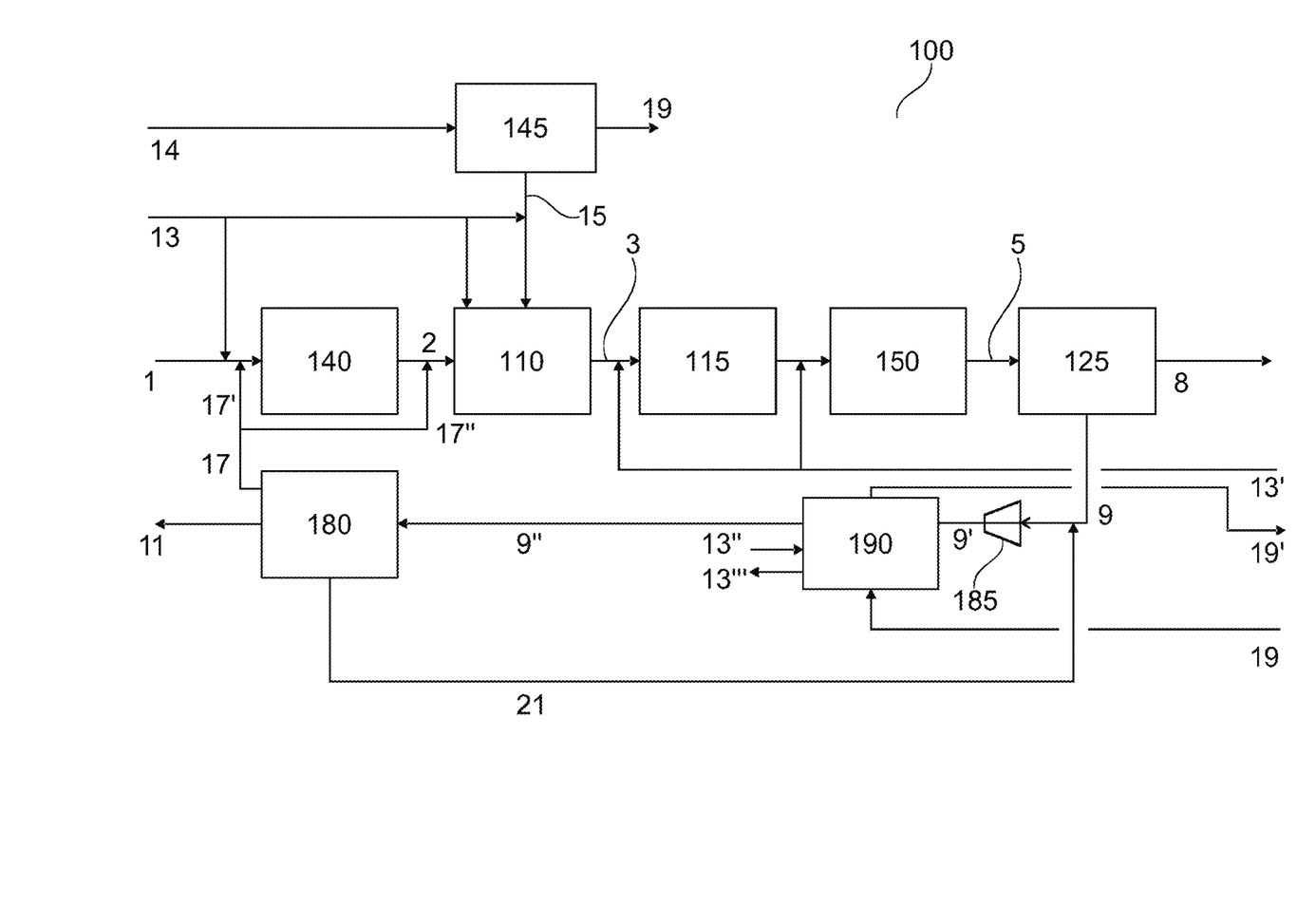
FIG. 1 illustrates a layout of an ATR-based hydrogen process and plant in accordance with an embodiment of the invention.

The appended FIG. 1 (drawing) shows a plant 100 for producing hydrogen in which a hydrocarbon feed 1, i.e. main hydrocarbon feed 1, such as natural gas, is passed to a reforming section comprising a pre-reforming unit 140 and a reforming unit 110 here illustrated as an autothermal reformer. The reforming section may also include a hydrogenator and sulfur absorber unit (not shown) upstream the pre-reforming unit 140. The hydrocarbon stream 1 is mixed with steam 13. The resulting hydrocarbon feed 2 is fed to ATR 110, as so is oxygen-rich stream 15 and steam 13. The oxygen-rich stream 15 is produced by means of an air separation unit (ASU) 145 to which air 14 is fed. The ASU 145 produces also a nitrogen-rich stream 19, which in this embodiment of the invention is used as inlet regeneration gas stream in drying unit 190 of the plant 100. In the ATR 110, the hydrocarbon feed 2 is converted to a syngas stream 3, which is then passed to a shift section 115, 150. The shift section comprises for instance a high temperature shift (HTS) unit 115 where additional or extra steam 13' also may be added upstream. Additional shift units, such as a low temperature shift (LTS) unit 150 may also be included in the shift section. It would be understood that the shift section may include any of HTS, MTS and LTS, or combinations thereof. Additional or extra steam 13' may also be added downstream the HTS unit 115 but upstream the low temperature shift unit 150. From the shift section, a shifted gas stream 5 is then fed, e.g. directly fed as shown here, to a hydrogen purification unit 125, e.g. a PSA-unit, from which a high-purity $H_2$ stream as hydrogen product 8 is produced, as well as a $CO_2$-rich off-gas stream 9.

A $CO_2$-rich off-gas recycle compressor 185 is arranged to receive and compress said $CO_2$-rich off-gas stream 9 into a compressed $CO_2$-rich off-gas stream 9'. A drying unit 190, e.g. a TSA unit, is arranged downstream to receive the compressed $CO_2$-rich off-gas stream 9' and provide a dried compressed $CO_2$-rich off-gas stream 9". The drying unit 190 is further arranged to receive inlet regeneration gas stream 19, here illustrated as said nitrogen-rich stream 19, and to withdraw an exit regeneration gas stream 19'. Inlet regeneration stream 19 may also be at least a portion of $CO_2$-product stream 11, or at least a portion of $CO_2$-depleted off-gas stream 17, 17', 17", or at least a portion of optional $CO_2$-recycling stream 21; or at least a portion of hydrogen product 8.

A heat exchanging unit (heater, not shown) is arranged in the drying unit 190 to preheat the inlet regeneration gas stream 19 by indirect cooling of a heat exchanging medium, here illustrated as steam 13" from a steam header, e.g. a low pressure (LP) steam header or HP saturated steam header of the plant 100 (not shown). A cooled heat exchanging medium as a steam condensate 13" is thereby generated and withdrawn. A low temperature $CO_2$-removal section 180, e.g. a cryogenic unit, is arranged to receive said dried compressed $CO_2$-rich off-gas stream 9" for removal of $CO_2$, thereby providing: a $CO_2$-product stream 11, $CO_2$-depleted off-gas stream 17, 17', 17", and $CO_2$-recycling stream 21.

The plant 100 is further arranged for recycling, e.g. directly recycling, the $CO_2$-depleted off-gas stream or a portion thereof 17, 17', 17" to the feed side of the prereformer 140, or to the feed side of the reforming unit, here ATR 110, or to the shift section (not shown). The plant 100 may further comprise at least one fired heater (not shown) arranged to pre-heat the hydrocarbon feed 1, 2 prior to it being fed to the reforming unit 110. The $CO_2$-depleted off-gas stream 17, 17', 17" is thereby provided as fuel for the fired heater.

The invention claimed is:

1. A plant for producing a hydrogen product from a hydrocarbon feed, said plant comprising:
    a reforming unit, said reforming unit being arranged to receive a hydrocarbon feed and convert it to a syngas stream;
    a shift section being arranged to receive said syngas stream from the steam reforming unit and shift it into a shifted syngas stream;
    a hydrogen purification unit, arranged to receive said shifted syngas stream and separate it into a high-purity $H_2$ stream as said hydrogen product, and a $CO_2$-rich off-gas stream;
    a steam header arranged to receive steam produced by the cooling of: said syngas stream and/or said shifted syngas stream;
    a $CO_2$-rich off-gas compressor, arranged to receive and compress said $CO_2$-rich off-gas stream into a compressed $CO_2$-rich off-gas stream;
    a drying unit arranged to receive the compressed $CO_2$-rich off-gas stream and provide a dried compressed $CO_2$-rich off-gas stream; said drying unit further being arranged to receive an inlet regeneration gas stream and to withdraw an exit regeneration gas stream; said drying unit further comprising: a heat exchanging unit arranged to preheat the inlet regeneration gas stream by indirect cooling of a heat exchanging medium selected from any of: steam from said steam header, said syngas stream, said shifted syngas stream, a flue gas stream generated in said reforming unit, steam produced by cooling of the flue gas stream and any combination thereof; and provide a cooled heat exchanging medium as a steam condensate or as a cooled gas;
    a low temperature $CO_2$-removal section arranged to receive said dried compressed $CO_2$-rich off-gas stream for removal of $CO_2$ from the $CO_2$-rich off-gas stream or from said dried compressed $CO_2$-rich off-gas stream, and provide at least: a $CO_2$-product stream and a $CO_2$-depleted off-gas stream.

2. The plant according to claim 1, wherein said steam header is a low pressure (LP) steam header or a high pressure (HP) saturated steam header.

3. The plant according to claim 2, wherein said low pressure (LP) steam header or said high pressure (HP) saturated steam header is arranged to receive steam produced by the cooling of said flue gas stream.

4. The plant according to claim 3, wherein said heat exchanging unit of drying unit is arranged to preheat the inlet regeneration gas stream by indirect cooling of said flue gas stream as said heat exchanging medium.

5. The plant according to claim 1, wherein said low temperature $CO_2$-removal section also provides a $CO_2$-recycling stream; and the plant is further arranged to feed at least a portion of said $CO_2$-recycling stream to a location upstream said $CO_2$-rich off-gas compressor and downstream said hydrogen purification unit; or to combine at least a portion of said $CO_2$-recycling stream with said shifted syngas stream upstream said hydrogen purification unit.

6. The plant according to claim 1, wherein said plant is further arranged for recycling said $CO_2$-depleted off-gas stream or a portion thereof, at least to the feed side of the reforming unit.

7. The plant according to claim 1, further comprising at least one fired heater arranged to pre-heat said hydrocarbon feed prior to it being fed to the reforming unit, and wherein said plant is arranged to feed at least a part of the $CO_2$-rich off-gas stream from said hydrogen purification unit, or at least part of said $CO_2$-depleted off-gas stream as fuel for said fired heater.

8. The plant according to claim 1, wherein
    said plant further comprises at least one prereformer unit arranged upstream the reforming unit, said prereformer unit being arranged to pre-reform said hydrocarbon feed prior to it being fed to the reforming unit.

9. The plant according to claim 1, wherein said reforming unit comprises an autothermal reformer (ATR), and the plant further comprises an Air Separation Unit (ASU) which is arranged to receive an air stream and produce a $N_2$-rich stream and an $O_2$-rich stream; and the inlet regeneration gas stream is at least a portion of said $N_2$-rich stream.

10. The plant according to claim 1, wherein the inlet regeneration gas stream is selected from:
   at least a portion of any of said: $CO_2$-product stream, $CO_2$-depleted off-gas stream, $CO_2$-recycling stream, and dried compressed $CO_2$-rich off-gas stream;
   at least a portion of said hydrogen product.

11. The plant according to claim 1, wherein the plant further comprises:
   a cooler arranged to receive the exit regeneration gas stream for condensing its water content and to provide a dried exit regeneration gas stream;
   a recycle regeneration gas compressor arranged to receive and compress the exit regeneration gas stream or the dried exit regeneration gas stream into a compressed exit regeneration gas stream or compressed dried exit regeneration gas stream, and recycle it to:
   inlet of said drying unit; or
      inlet of said hydrogen purification unit; or
      inlet of said $CO_2$-rich off-gas compressor.

12. The plant according to claim 1, wherein the low temperature $CO_2$-removal section is a cryogenic separation unit comprising a cryogenic compressor; the plant further comprising a superheated steam header and a steam turbine for providing electricity for said cryogenic compressor, and said steam turbine is arranged to receive a portion of steam from said superheated steam header for providing said electricity.

13. The plant according to claim 1, wherein: the drying unit is a temperature swing adsorption (TSA) unit.

14. The plant according to claim 6, wherein the plant is arranged for said $CO_2$-depleted off-gas stream or a portion thereof being directly recycled to at least a feed side of the reforming unit.

15. The plant according to claim 1, wherein the plant is arranged to directly feed said shifted syngas stream to said hydrogen purification unit.

16. A process for producing a hydrogen product from a hydrocarbon feed, said process comprising the steps of:
   providing a plant according claim 1;
   supplying the hydrocarbon feed to the reforming unit, and converting it to the syngas stream;
   supplying the stream of syngas from the reforming unit to the shift section, and shifting it in a shift step, thereby providing the shifted syngas stream;
   supplying the shifted gas stream from the shift section to hydrogen purification unit, and separating it into high-purity $H_2$ stream as said hydrogen product and $CO_2$-rich off-gas stream;
   the process further comprising:
   compressing said $CO_2$-rich off-gas stream into the compressed $CO_2$-rich off-gas stream;
   drying the compressed $CO_2$-rich off-gas stream in a drying unit under the addition of an inlet regeneration gas stream, thereby providing the dried compressed $CO_2$-rich off-gas stream and the exit regeneration gas stream;
   preheating the inlet regeneration gas stream by indirect cooling of the heat exchanging medium selected from any of: the steam from the steam header, the syngas stream, the shifted syngas stream, the flue gas stream being generated in said reforming unit, the steam produced by cooling of the flue gas stream and any combination thereof; thereby providing the cooled heat exchanging medium as: the steam condensate or the cooled gas being a cooled steam, a cooled synthesis gas, a cooled shifted syngas stream, and/or a cooled flue gas stream;
   supplying the dry compressed $CO_2$-rich off-gas stream to a $CO_2$-removal step in a low temperature $CO_2$-removal section, thereby providing a $CO_2$-product stream, a $CO_2$-depleted off-gas stream, and/or a $CO_2$-recycling stream.

17. The plant of claim 1, wherein the heat exchanging unit is arranged to preheat the inlet regeneration gas stream by indirect cooling of said shifted syngas stream as said heat exchange medium; and wherein the cooled heat exchanging medium is a cooled shifted syngas stream.

18. The plant of claim 1, wherein the heat exchanging unit is arranged to preheat the inlet regeneration gas stream by indirect cooling of said syngas stream as said heat exchange medium; and wherein the cooled heat exchanging medium is a cooled syngas stream.

19. The plant of claim 1, wherein the heat exchanging unit is arranged to preheat the inlet regeneration gas stream by indirect cooling of said steam from said steam header as said heat exchange medium; and wherein the cooled heat exchanging medium is cooled steam or steam condensate.

20. The plant of claim 1, wherein the heat exchanging unit is arranged to preheat the inlet regeneration gas stream by indirect cooling of said flue gas stream as said heat exchange medium; and wherein the cooled heat exchanging medium is a cooled flue gas stream.

21. The plant of claim 1, wherein the heat exchanging unit is arranged to preheat the inlet regeneration gas stream by indirect cooling of said steam produced by cooling of said flue gas stream as said heat exchange medium; and wherein the cooled heat exchanging medium is cooled steam or steam condensate.

22. The plant of claim 1, wherein heat from said heat exchange medium is used to heat a drying stream of the drying unit and/or regenerate an adsorption material or bed of the drying unit.

23. The plant of claim 22, wherein the drying unit is a temperature swing adsorption (TSA) unit.

24. The plant of claim 1, wherein the reforming unit comprises an autothermal reformer (ATR).

25. The plant of claim 1, wherein the reforming unit is a combination of an autothermal reformer (ATR) and a gas heated reformer (GHR).

26. The plant of claim 1, wherein the reforming unit comprises a steam methane reformer (SMR).

27. The plant of claim 1, wherein the shift section is a high temperature shift unit, medium temperature shift unit or a combination thereof.

28. The plant of claim 1, wherein the hydrogen purification unit is a pressure swing adsorption (PSA) unit.

29. The plant of claim 1, wherein the low temperature $CO_2$-removal section is a cryogenic separation unit.

30. The plant of claim 1, wherein the low temperature $CO_2$-removal section is a physical absorption unit, an adsorption unit or a combination thereof.

* * * * *